US011945126B1

(12) United States Patent
Marfione

(10) Patent No.: US 11,945,126 B1
(45) Date of Patent: Apr. 2, 2024

(54) POCKET KNIFE

(71) Applicant: Anthony Louis Marfione, Mills River, NC (US)

(72) Inventor: Anthony Louis Marfione, Mills River, NC (US)

(73) Assignee: Microtech Knives, Inc., Mills River, NC (US)

( * ) Notice: Subject to any disclaimer, the term of this patent is extended or adjusted under 35 U.S.C. 154(b) by 0 days.

(21) Appl. No.: 18/470,052

(22) Filed: Sep. 19, 2023

(51) Int. Cl.
*B26B 1/08* (2006.01)
*B26B 1/10* (2006.01)

(52) U.S. Cl.
CPC . *B26B 1/10* (2013.01); *B26B 1/08* (2013.01)

(58) Field of Classification Search
CPC .................................... B26B 1/10; B26B 1/08
See application file for complete search history.

(56) References Cited

U.S. PATENT DOCUMENTS 3,921,289 A * 11/1975 Hasegawa ................. B26B 1/08 30/342
4,947,552 A * 8/1990 Barnes .................... B26B 1/046 30/159
6,085,423 A 7/2000 Marifone
7,305,769 B2 12/2007 McHenry
7,562,455 B2 7/2009 McHenry
7,574,804 B2 8/2009 Bezold
8,595,941 B2 12/2013 Lee
8,671,578 B1 3/2014 Frazer
9,375,854 B2 6/2016 Chu
9,498,889 B1 11/2016 Hawk
9,764,485 B1 9/2017 Hawk
10,220,527 B1 3/2019 Marfione
10,500,740 B1 12/2019 Marfione et al.
10,807,253 B1 10/2020 Mandeville
11,607,818 B1 3/2023 Crawford et al.
2006/0207102 A1 9/2006 Bezold
2007/0175045 A1 8/2007 McHenry
2008/0222895 A1 9/2008 Marfione
2008/0222897 A1 9/2008 Marione
2009/0235534 A1 9/2009 Chu
2014/0101943 A1 4/2014 Chu
2014/0173911 A1 6/2014 Chu
2019/0232508 A1* 8/2019 Onion ........................ B26B 1/10
2020/0156269 A1* 5/2020 Sullivan .................. B26B 5/001

* cited by examiner

*Primary Examiner* — Hwei-Siu C Payer
(74) *Attorney, Agent, or Firm* — Steve LeBlanc, LLC

(57) ABSTRACT

A pocket knife includes a first scale having a first scale inner surface, a second scale opposed to the first scale having a second scale inner surface, and a cavity between the first scale inner surface and the second scale inner surface. A blade has a cutting edge, and the blade has a retracted position in which the cutting edge is inside of the cavity and a deployed position in which the cutting edge is outside of the cavity. A recess in the first scale inner surface extends from the first scale inner surface partially through the first scale, and a flange is around at least a portion of the recess in the first scale inner surface. A boss extends from the second scale inner surface into the recess in the first scale inner surface, and an end of the boss is tapered toward the second scale inner surface.

16 Claims, 13 Drawing Sheets

POCKET KNIFE

FIELD OF THE INVENTION

The present invention generally involves a pocket knife. In particular embodiments, the pocket knife may be a manual, single action, double action, out-the-front, or folding knife design.

BACKGROUND OF THE INVENTION

Pocket knives generally include a folding or sliding blade that may be easily carried by a user. The blade generally has a cutting edge that can move between retracted and deployed positions with respect to a handle or a chassis. In the retracted position, the cutting edge is inside of the handle or chassis to shield the cutting edge from inadvertent contact that might damage the blade or cause harm to personnel or objects. In the deployed position, the cutting edge is outside of the handle or chassis to allow use of the cutting edge as desired.

A manually operated pocket knife design generally requires two hands to deploy and retract the blade. A single action pocket knife design typically includes a spring that assists the user to deploy the blade using a single hand, whereas a double action pocket knife design generally includes a spring that assists the user to both deploy and retract the blade using a single hand. Each design balances the convenience and speed of operation with increased risk associated with inadvertent operation.

The handle or chassis often includes a pair of scales connected together to form a cavity that houses the blade in the retracted position and supports the various components associated with operation of the pocket knife. Screws that extend through one or both scales are often used to align and securely connect the scales together, while also facilitating disassembly of the handle or chassis when needed to repair or replace the various components inside the handle or chassis. However, the screws and associated counterbores may be damaged during assembly or maintenance, and screws that extend through one or both scales interfere with an aesthetically clean appearance of the handle or chassis. Therefore, the need exists for an improved pocket knife design that reduces the need for screws or counterbores to pass completely through the scales.

BRIEF DESCRIPTION OF THE INVENTION

Aspects and advantages of the invention are set forth below in the following description, or may be obvious from the description, or may be learned through practice of the invention.

One embodiment of the present invention is a pocket knife that includes a first scale that has a first scale inner surface, a second scale opposed to the first scale that has a second scale inner surface, and a cavity between the first scale inner surface and the second scale inner surface. A blade has a cutting edge, and the blade has a retracted position in which the cutting edge is inside of the cavity and a deployed position in which the cutting edge is outside of the cavity. A recess in the first scale inner surface extends from the first scale inner surface partially through the first scale, and a flange is around at least a portion of the recess in the first scale inner surface. A boss extends from the second scale inner surface into the recess in the first scale inner surface, and an end of the boss is tapered toward the second scale inner surface.

An alternate embodiment of the present invention is a pocket knife that includes a first scale that has a first scale inner surface and a second scale opposed to the first scale that has a second scale inner surface. A blade has a cutting edge, and the blade has a retracted position in which the cutting edge is between the first scale inner surface and the second scale inner surface. A recess in the first scale inner surface extends from the first scale inner surface partially through the first scale, and a diameter of the recess decreases toward the first scale inner surface. A boss extends from the second scale inner surface into the recess in the first scale inner surface, and a perimeter of the boss increases away from the second scale inner surface.

In yet another embodiment of the present invention, a pocket knife includes a first scale that has a first scale inner surface and a second scale opposed to the first scale that has a second scale inner surface. A blade has a cutting edge, and the blade has a retracted position in which the cutting edge is between the first and second scales. The pocket knife further includes a means for aligning the first scale to the second scale.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
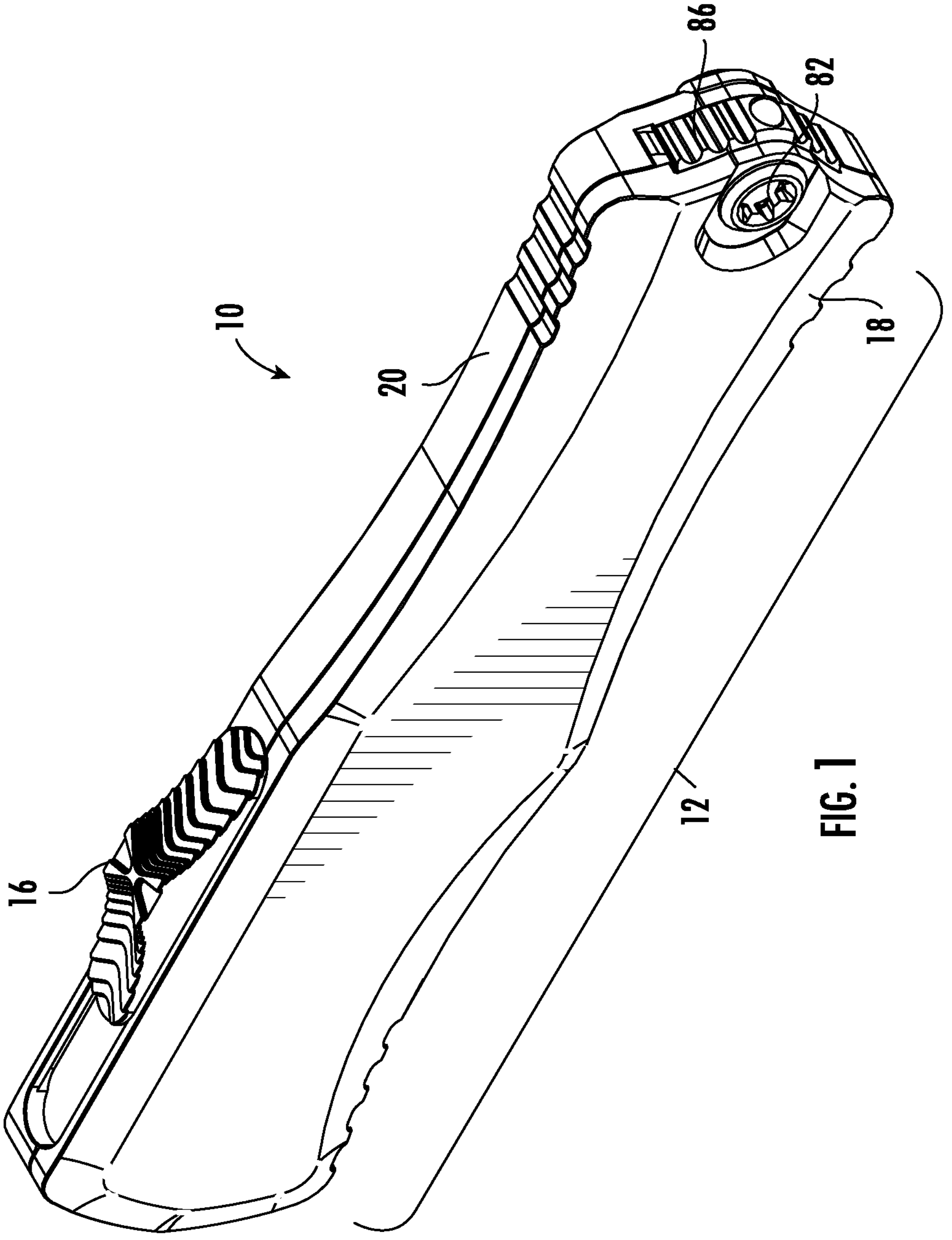
FIG. 1 is a perspective view of a pocket knife according to one embodiment of the present invention in a retracted position.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Embodiments of the present invention include a pocket knife having a chassis formed from opposing scales. The opposing scales include a combination of one or more recesses and bosses that align the opposing scales and reduce the need for screws or counterbores to pass completely through the opposing scales. Unless specifically recited in the claims, the pocket knife may be a manual, a single action, a double action, an out-the-front, or a folding knife design. For convention of reference, the term "front" shall refer to the end of the pocket knife from which a blade extends; the term "rear" shall refer to the end of the pocket knife that is opposite from the front; the term "top" shall refer to the side of the pocket knife that houses an actuator for operating the pocket knife; the term "bottom" shall refer to the side of the pocket knife that is opposite from the top; and the terms "left" and "right" shall refer to the opposing sides of the pocket knife that are adjacent to and generally perpendicular to the top and bottom. As used herein, the term "longitudinal" shall refer to the direction between the front and rear of the pocket knife, and the term "radial" shall refer to any direction perpendicular to the longitudinal direction.

Figure 2:
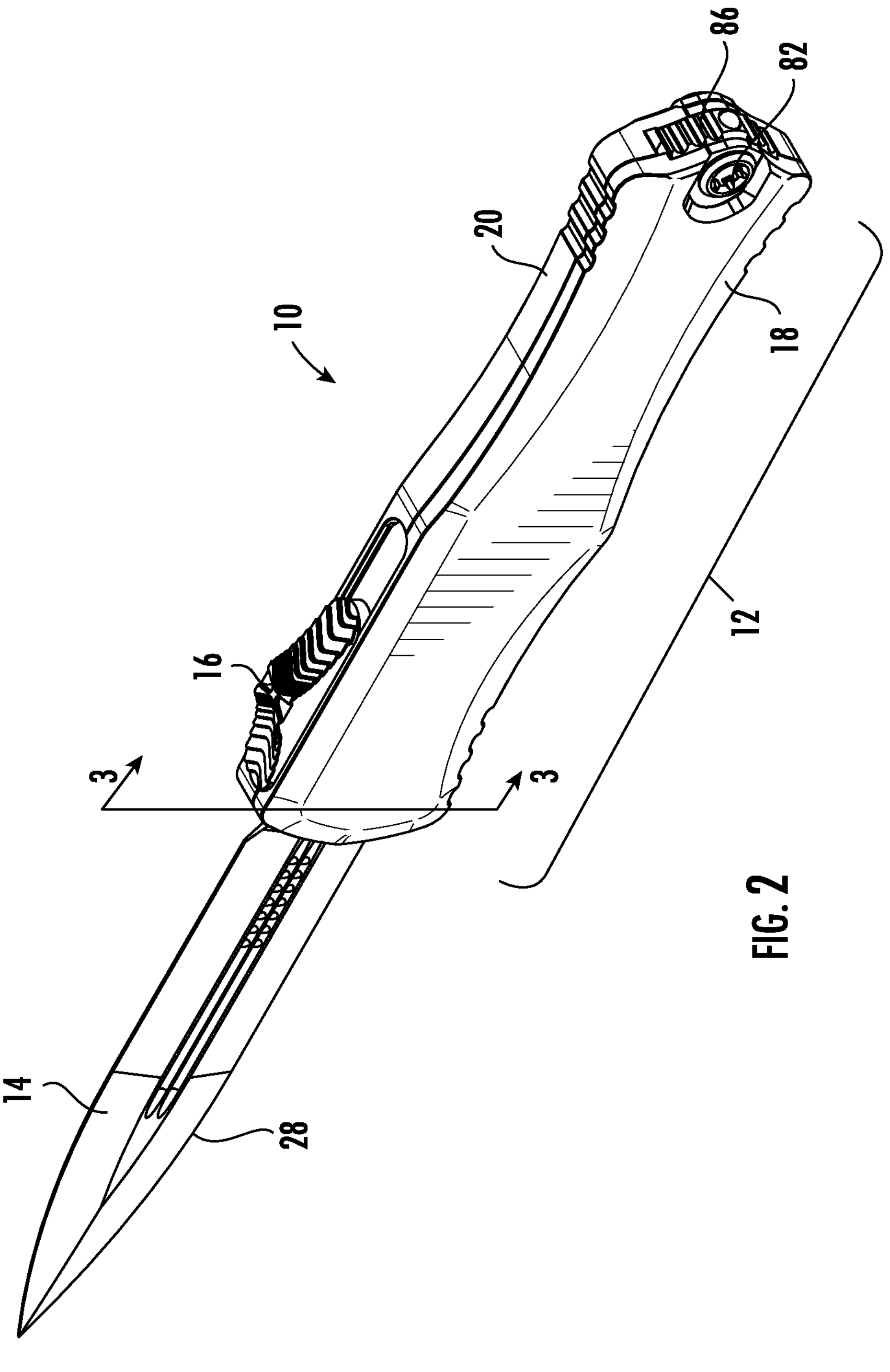
FIG. 2 is a perspective view of the pocket knife shown in FIG. 1 in a deployed position.
Figure 3:
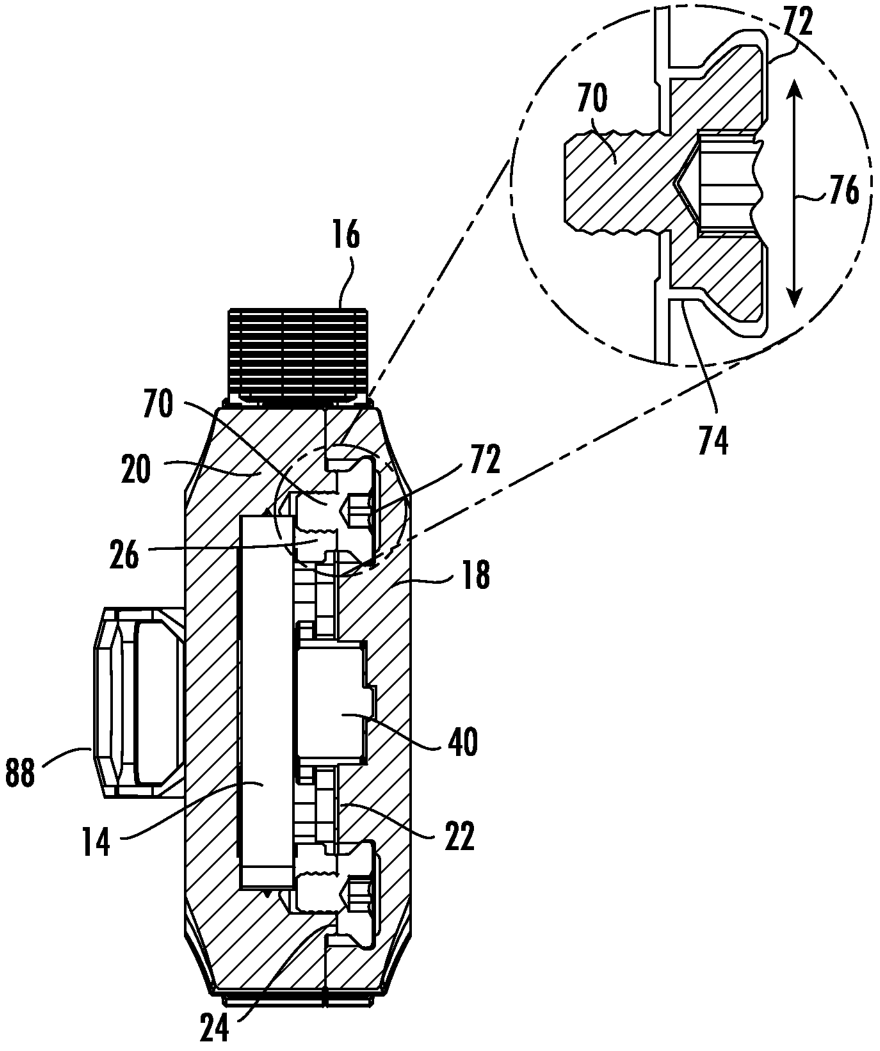
FIG. 3 is an axial cross-section of the pocket knife shown in FIG. 2 taken along 3-3.

FIGS. 1 and 2 provide perspective views of a pocket knife 10 according to one embodiment of the present invention in retracted and deployed positions, respectively, and FIG. 3 provides an axial cross-section of the pocket knife 10 shown in FIG. 2 taken along 3-3. As shown in FIGS. 1-3, the pocket knife 10 generally includes a chassis 12, a blade 14, and an actuator 16.

The chassis 12 provides a frame for supporting the various components associated with the pocket knife 10 and may be molded, pressed, or machined from plastics, metals, polymers, or any material or combination of materials having the desired strength and durability. The chassis 12 generally includes a first or left scale 18 opposed to a second or right scale 20. As shown most clearly in FIG. 3, the first or left scale 18 has a first scale inner surface 22, and the second or right scale 20 has a second scale inner surface 24. When assembled together, the first and second scales 18, 20 produce a cavity 26 between the first scale inner surface 22 and the second scale inner surface 24.

Figure 12:
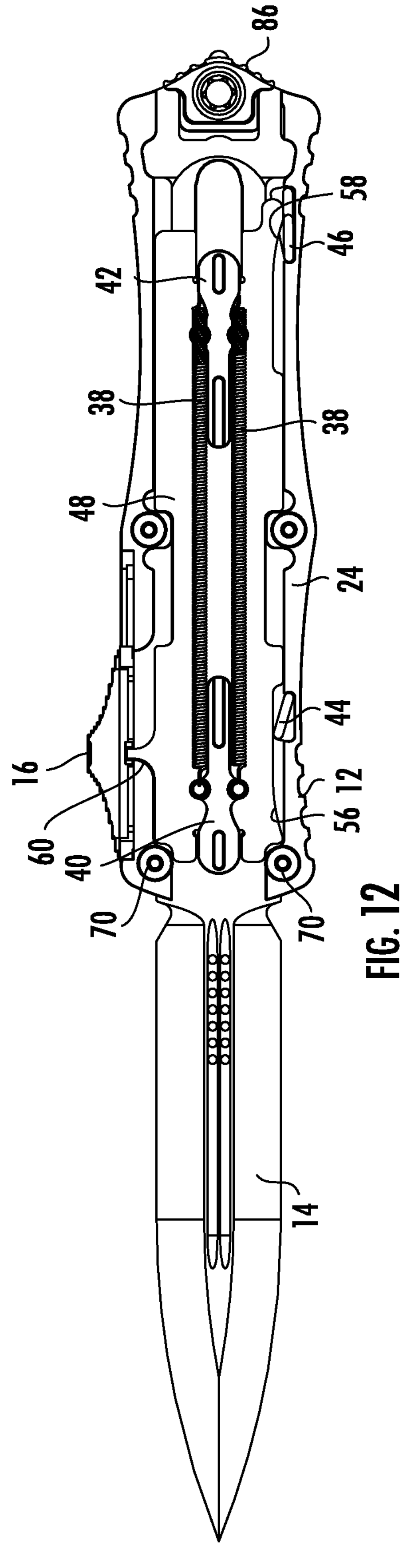
FIG. 12 is a left plan view of the pocket knife shown in FIGS. 1-3 with the left scale removed, the blade in the deployed position, the actuator in the open position, the slider in the front position, and the front lock engaged with the blade.
Figure 13:
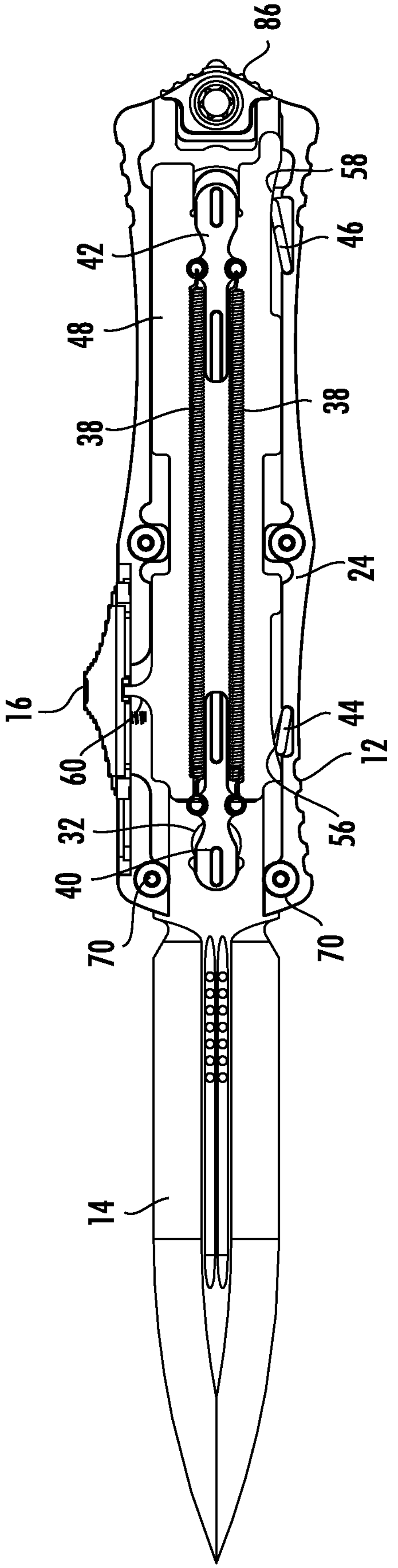
FIG. 13 is a left plan view of the pocket knife shown in FIGS. 1-3 with the left scale removed, the blade in the deployed position, the actuator in the shut position, the slider in the rear position, and the front lock released from the blade.

The blade 14 generally has one or more cutting edges 28 and can move between retracted and deployed positions. In the retracted position, as shown in FIGS. 1, 8, 10, and 11, the cutting edge 28 is inside of the cavity 26 or between the first scale inner surface 22 and the second scale inner surface 24 to shield the cutting edge 28 from inadvertent contact that might damage the blade 14 or cause harm to personnel or objects. In the deployed position, as shown in FIGS. 2, 12, and 13, the cutting edge 28 is outside of the cavity 26 of the chassis 12 to allow use of the cutting edge 28 as desired.

For the embodiment shown in FIGS. 1-3, the actuator 16 is in sliding contact with the chassis 12 and controls the operation of the pocket knife 10. The actuator 16 has a shut or rear position, shown in FIGS. 1, 10, and 13, that moves the blade 14 to the retracted position and an open or front position, shown in FIGS. 2, 11, and 12, that moves the blade 14 to the deployed position.

Figure 4:
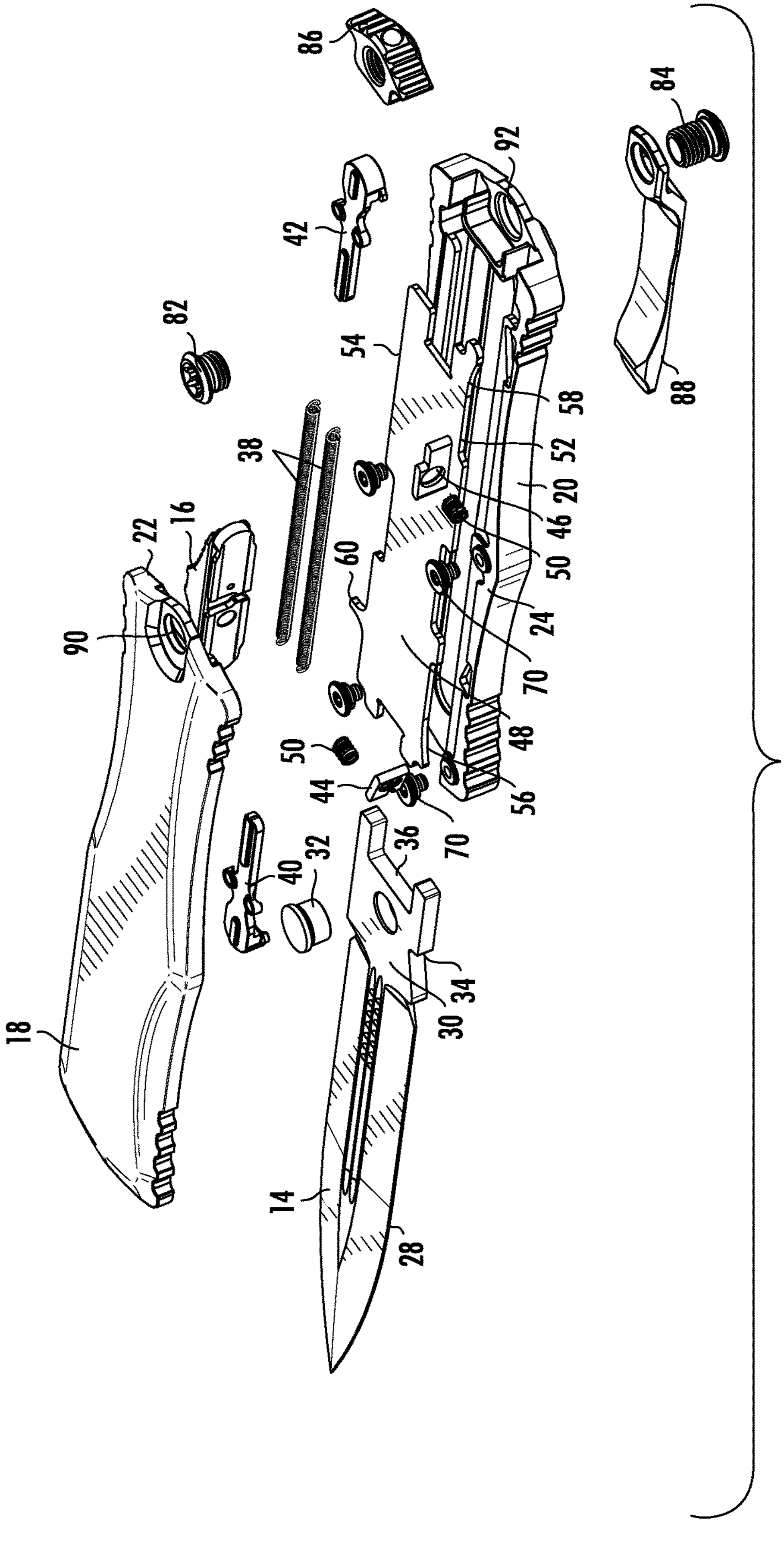
FIG. 4 is an exploded view of the pocket knife shown in FIGS. 1-3.

FIG. 4 provides an exploded view of the pocket knife 10 shown in FIGS. 1-3. As shown in FIG. 4, the rear portion of the blade 14 generally includes a tang 30, and the tang 30 of the blade 14 may include a post 32 and a notch 34 longitudinally separated from a rear surface 36 of the blade 14. In particular embodiments, the post 32 may be simply a projection from the tang 30, while in other embodiments, as shown in FIG. 4, the post 32 may be a separate part threaded or press-fit into the tang 30. The notch 34 may be on one or both sides of the tang 30. The purpose and operation of the post 32, notch 34, and rear surface 36 will be described in more detail with respect to operation of the blade 14 between the retracted and deployed positions as shown in FIGS. 10-13.

As shown most clearly in FIG. 4, one or more springs 38, front and rear operators 40, 42, front and rear locks 44, 46, and a slider 48 may be located inside the cavity 26 of the chassis 12. The springs 38 connect the front operator 40 to the rear operator 42. As will be explained in more detail with respect to FIGS. 10-13, the front and rear operators 40, 42 alternately engage with the blade 14 and the slider 48 to move the blade 14 between the retracted and deployed positions.

The front and rear locks 44, 46 may be pivotally connected to the chassis 12 and biased radially inward in the cavity 26 by springs 50. With the blade 14 in the retracted position, the rear lock 46 is in biased engagement with the notch 34 in the tang 30 to lock the blade 14 inside the chassis 12. Conversely, with the blade 14 in the deployed position, the front lock 44 is in biased engagement with the rear surface 36 of the tang 30 to lock the blade 14 outside of the chassis 12.

The slider 48 has a first side 52 opposed to a second side 54 and may include a front sloped surface 56 and a rear sloped surface 58 on either of the first or second sides 52, 54. In the particular embodiment shown in FIG. 4, the front and rear sloped surfaces 52, 54 are located or defined on the first side 52 of the slider 48 to engage with the front and rear locks 44, 46 as the slider 48 moves longitudinally in the cavity 26. In alternate embodiments, the front and rear sloped surfaces 56, 58 may be located or defined on opposite sides 52, 54 of the slider 48 to correspond to the positions of the associated front and rear locks 44, 46, and the present invention is not limited to the specific location of the front and rear sloped surfaces 56, 58 unless specifically recited in the claims.

A tab 60 may extend from whichever side of the slider 48 is closest to the actuator 16 so that the tab 60 engages with the actuator 16 and the actuator 16 and the slider 48 move together. In the particular embodiment shown in FIG. 4, for example, the tab 60 extends from the second side 54 of the slider 48. In this manner, forward and rearward movement of the actuator 16 moves the slider 48 the same direction and distance.

The slider 48 has a rear position that moves the blade 14 to the retracted position and a front position that moves the blade 14 to the deployed position. Specifically, with the slider 48 in the front position and the blade 14 locked in the deployed position, as the slider 48 moves to the rear position, the slider 48 engages with the rear operator 42 to create tension in the springs 38. Rearward movement of the slider 48 causes the front sloped surface 56 to engage with the front lock 44 to pivot the front lock 44 outward, disengaging the front lock 44 from the rear surface 36 of the tang 30 to allow the springs 38 to pull the front operator 40 against the post 32 in the tang 30 to move the blade 14 to the retracted position. Conversely, with the slider 48 in the rear position and the blade 14 locked in the retracted position, as the slider 48 moves to the front position, the slider 48 engages with the front operator 40 to create tension in the springs 38. Forward movement of the slider 48 causes the rear sloped surface 58 to engage with the rear lock 46 to pivot the rear lock 46 outward, disengaging the rear lock 46 from the notch 34 in the tang 30 of the blade 14 to allow the springs 38 to pull the rear operator 42 against the rear surface 36 of the tang 30 to move the blade 14 to the deployed position.

Figure 5:
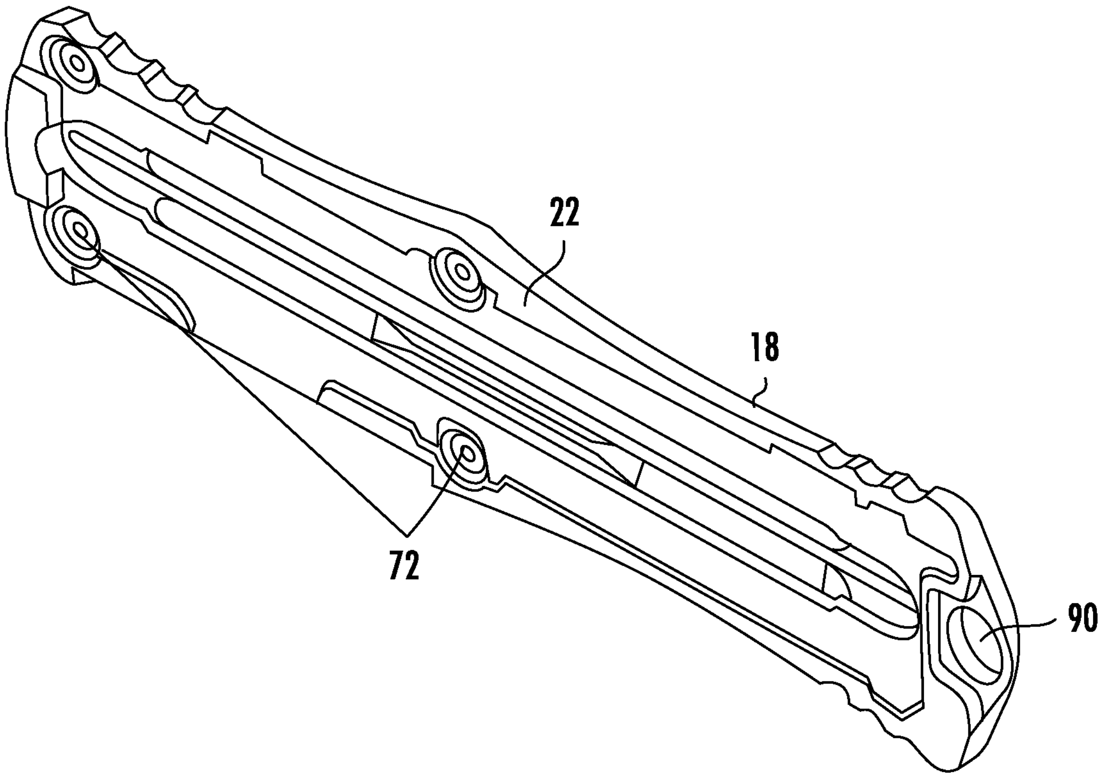
FIG. 5 is a perspective view of the left scale shown in FIG. 4.
Figure 6:
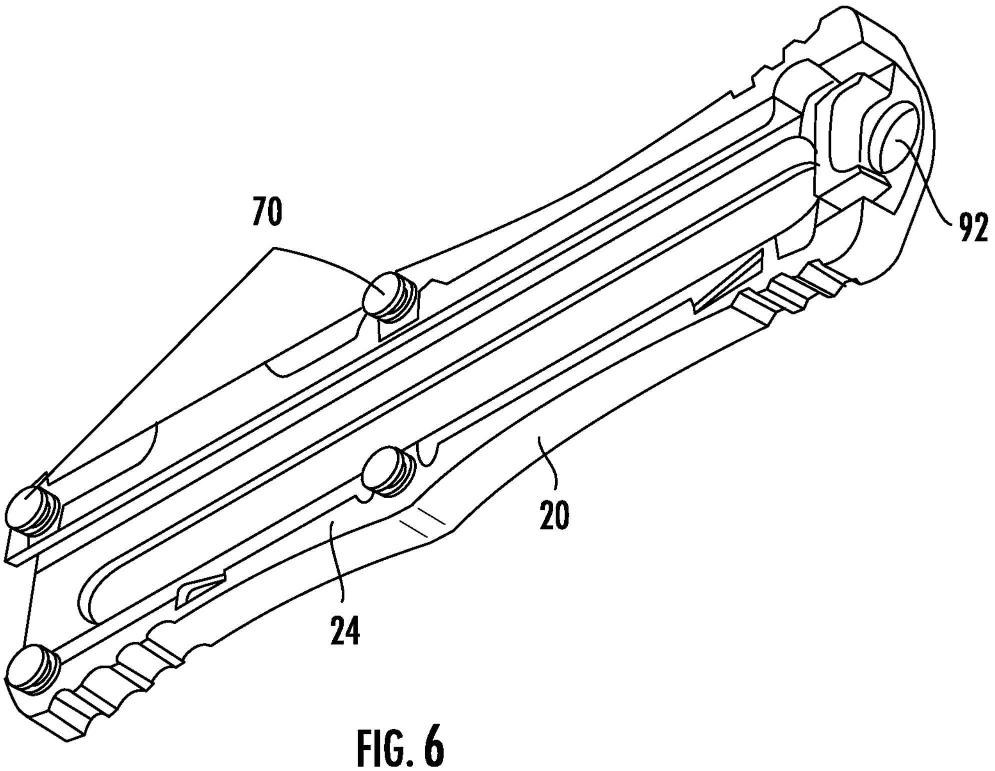
FIG. 6 is a perspective view of the right scale shown in FIG. 4.
Figure 7:
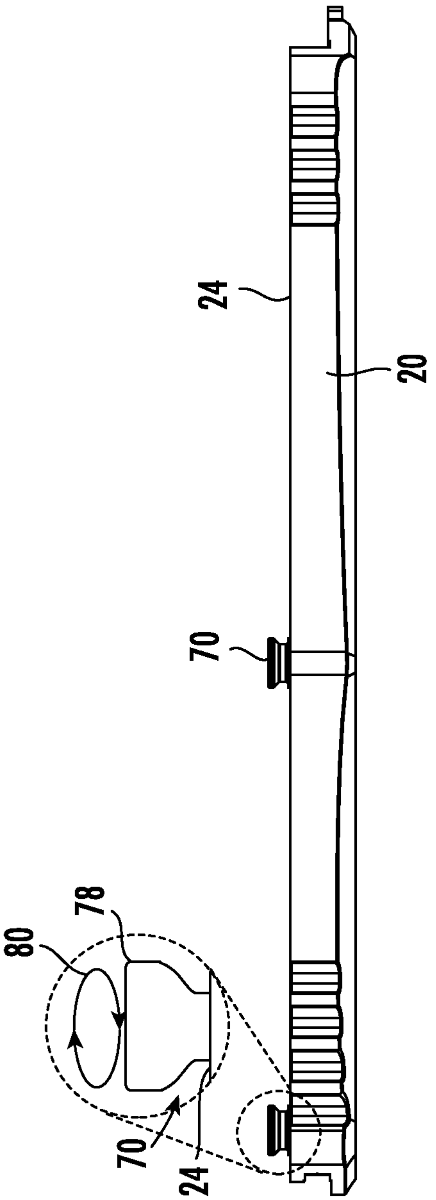
FIG. 7 is a bottom plan view of the right scale shown in FIG. 5.

FIG. 5 provides a perspective view of the inner surface 22 of the left scale 18, FIG. 6 provides a perspective view of the inner surface 24 of the right scale 20, and FIG. 7 provides a bottom plan view of the right scale 20. As shown in FIGS. 4-7, the pocket knife 10 includes a means for aligning the first or left scale 18 to the second or right scale 20. The function of the means is to align the first or left scale 18 to the second or right scale 20. The structure for aligning the first or left scale 18 to the second or right scale 20 is one or more bosses 70 that extend from the second scale inner surface 24 into corresponding one or more recesses 72 in the first scale inner surface 22.

As shown most clearly in FIGS. 1, 3, and 5, each recess 72 in the first scale inner surface 22 extends from the first scale inner surface 22 partially through the first or left scale 18. Each recess 72 further includes a flange 74 around at least a portion of the recess 72 so that a diameter 76 of the recess 72 decreases in the direction of or toward the first scale inner surface 22. In addition, each recess 72 may be elongated at the first scale inner surface 22 to more easily receive the corresponding boss 70 and allow the boss 70 to slidingly engage with the flange 74 around at least a portion of the recess 72 in the first scale inner surface 22.

As shown most clearly in FIGS. 3, 4, 6, and 7, each boss 70 extends from the second scale inner surface 24 into a corresponding recess 72 in the first scale inner surface 22. Each boss 70 may be extruded from or press fit into the second scale inner surface 24. Alternately, as shown most clearly in FIGS. 3 and 4, each boss 70 may be threaded into the second scale inner surface 24. As shown most clearly in FIGS. 3, 6, and 7, each boss 70 includes an end 78 that is tapered in the direction of or toward the second scale inner surface 24 so that a perimeter 80 of the boss 70 decreases in the direction of or toward the second scale inner surface 24.

Figure 8:
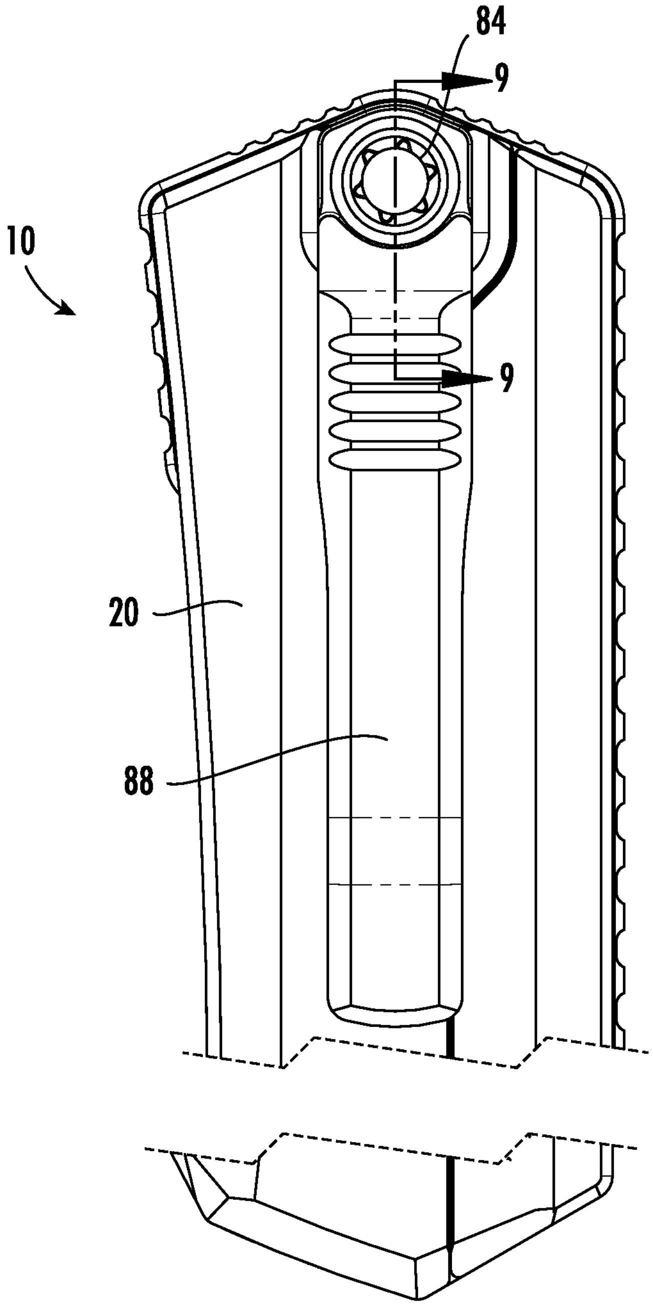
FIG. 8 is a right plan view of the pocket knife shown in FIG. 1.
Figure 9:
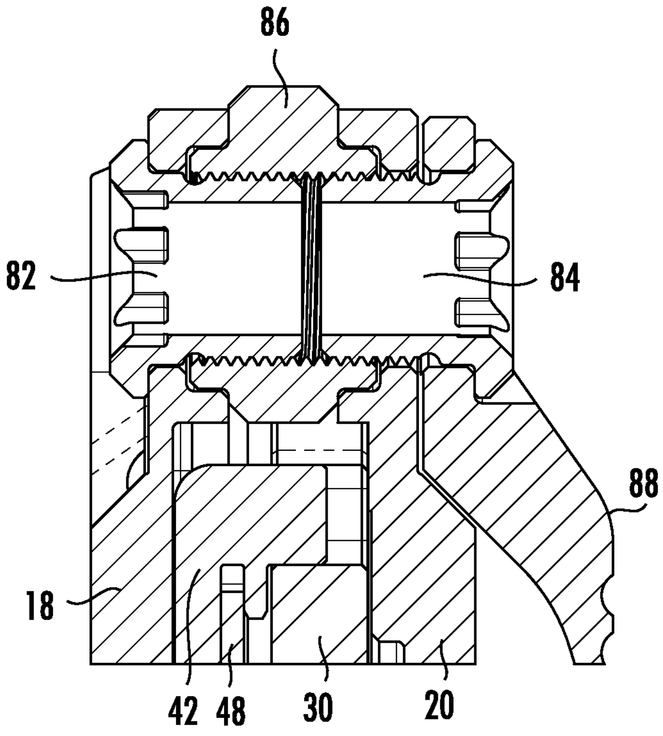
FIG. 9 is a cross-section view of the pocket knife shown in FIG. 8 taken along 9-9.

FIG. 8 provides a right plan view of the pocket knife 10 shown in FIG. 1, and FIG. 9 provides a cross-section view of the pocket knife 10 shown in FIG. 8 taken along 9-9. As shown in the right portion of FIG. 4 and FIGS. 8 and 9, the pocket knife 10 may further include a means for releasably connecting the first or left scale 18 to the second or right scale 20. The function of the means is to releasably connect the first or left scale 18 to the second or right scale 20. The structure for performing the function may include one or more screws or fasteners that releasably engage with the left and/or right scales 18, 20. In the particular embodiment shown in FIGS. 4, 8, and 9, the structure for releasably connecting the first or left scale 18 to the second or right scale 20 is a first or left screw 82, a second or right screw 84, and a threaded spacer 86. The threaded spacer 86 may be located between the left and right scales 18, 20, for example at the rear of the chassis 12 proximate to a pocket clip 88. The left screw 82 fits through an aperture 90 in the left scale 18 and threads into the threaded spacer 86. The right screw 84 similarly fits through an aperture 92 in the right scale 20 and threads into the threaded spacer 86. In this manner, the left and right screws 82, 84 releasably connect the left and right scales 18, 20, respectively, to the threaded spacer 86, thereby releasably connecting the left scale 18 to the right scale 20.

Figure 10:
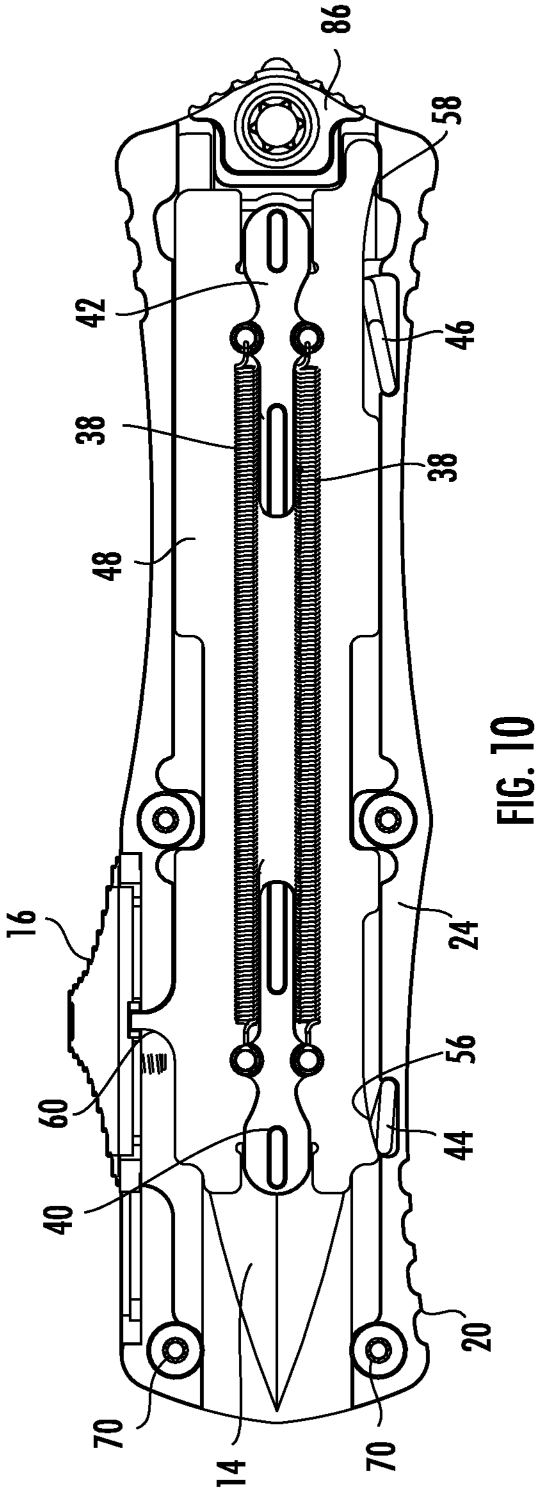
FIG. 10 is a left plan view of the pocket knife shown in FIGS. 1-3 with the left scale removed, the blade in the retracted position, the actuator in the shut position, the slider in the rear position, and the rear lock engaged with the blade.

Operation of the pocket knife 10 between the retracted and deployed positions will now be described with respect to FIGS. 10-13. As shown in FIG. 10, the actuator 16 is in the shut position, and the slider 48 is in the rear position with the blade 14 retracted inside the cavity 26. With the blade 14 in the retracted position, the rear operator 42 is engaged with the rear surface 36 of the tang 30, and the rear lock 46 is engaged with the notch 34 in the tang 30 to retain the blade 14 in the retracted position.

Figure 11:
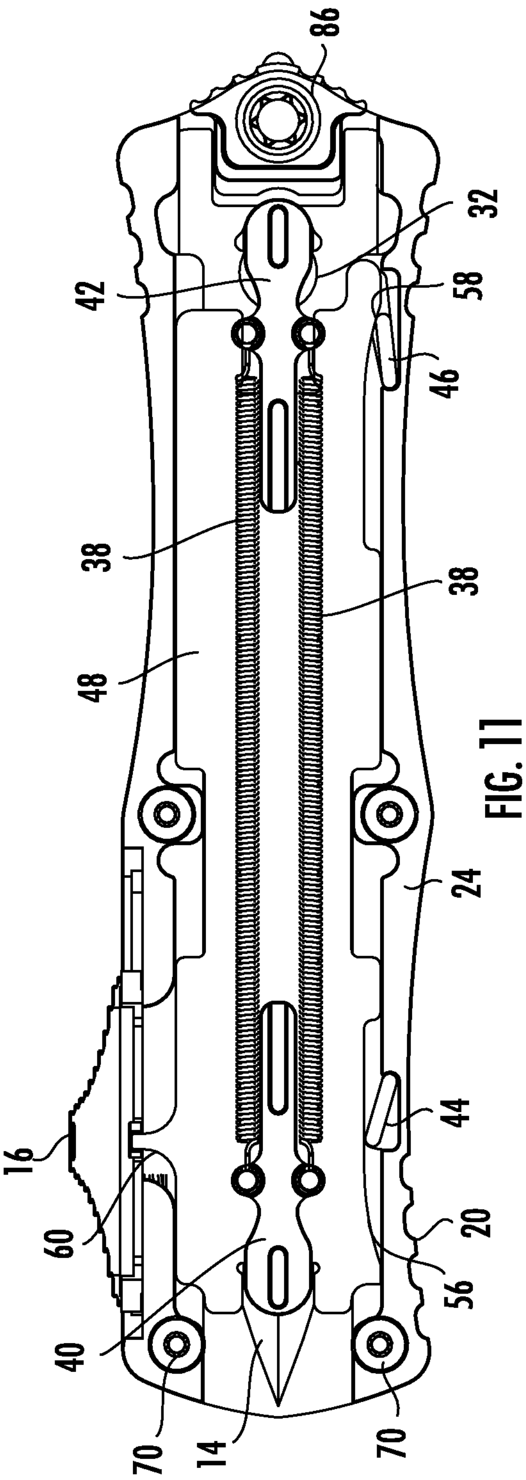
FIG. 11 is a left plan view of the pocket knife shown in FIGS. 1-3 with the left scale removed, the blade in the retracted position, the actuator in the open position, the slider in the front position, and the rear lock released from the blade.

To deploy the blade 14, the actuator 16 is moved forward to the open position as shown in FIG. 11, and the engagement between the tab 60 and the actuator 16 causes the slider 48 to move forward with the actuator 16. As the slider 48 initially moves forward, the rear lock 46 remains engaged with the notch 34 in the tang 30 to prevent the blade 14 from moving, and the front of the slider 48 engages with the front operator 40 to move the front operator 40 forward and create tension in the springs 38 between the front and rear operators 40, 42. Eventually, the rear sloped surface 58 on the first side 52 of the slider 48 disengages the rear lock 46 from the notch 34 to release the blade 14, as shown in FIG. 11.

When the rear lock 46 disengages from the notch 34, the tension in the springs 38 causes the rear operator 42 to eject the blade 14 out of the cavity 26 to the deployed position, as shown in FIG. 12. The blade 14 moves out of the cavity 26 until the post 32 contacts the front operator 40 to prevent further travel of the blade 14 out of the cavity 26. As shown in FIG. 12, the actuator 16 is in the open position with the blade 14 deployed outside of the cavity 26. In the deployed position, the front operator 40 is engaged with the post 32, and the front lock 44 is engaged with the rear surface 36 of the tang 30 to hold the blade 14 in the deployed position.

To retract the blade 14, the actuator 16 is moved rearward to the shut position as shown in FIG. 13, and the engagement between the tab 60 and the actuator 16 causes the slider 48 to move rearward with the actuator 16. As the slider 48 initially moves rearward, the front lock 44 remains engaged with the rear surface 36 of the tang 30 to prevent the blade 14 from moving, and the rear of the slider 48 engages with the rear operator 42 to move the rear operator 42 rearward and create tension in the springs 38 between the front and rear operators 40, 42. Eventually, the front sloped surface 56 on the first side 52 of the slider 48 disengages the front lock 44 from the rear surface 36 of the tang 30 to release the blade 14, as shown in FIG. 13.

When the front lock 44 disengages from the rear surface 36 of the tang 30, the tension in the springs 38 causes the front operator 40 to pull the blade 14 into the cavity 26 to the retracted position, as shown in FIG. 10. The blade 14 moves into the cavity 26 until the rear surface 36 of the tang 30 contacts the rear operator 42, and the rear lock 46 again engages with the notch 34 in the tang 30 to retain the blade 14 in the retracted position.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A pocket knife, comprising:
- a first scale, wherein the first scale has a first scale inner surface;
- a second scale opposed to the first scale, wherein the second scale has a second scale inner surface;
- a cavity between the first scale inner surface and the second scale inner surface;
- a blade having a cutting edge, wherein the blade has a retracted position in which the cutting edge is inside of the cavity and a deployed position in which the cutting edge is outside of the cavity;
- a recess in the first scale inner surface that extends from the first scale inner surface partially through the first scale;
- a flange around at least a portion of the recess in the first scale inner surface;
- a boss that extends from the second scale inner surface into the recess in the first scale inner surface; and
- an end of the boss that is tapered toward the second scale inner surface.

2. The pocket knife as in claim 1, wherein the boss is threaded into the second scale inner surface.

3. The pocket knife as in claim 1, wherein the recess is elongated, and the boss slidingly engages with the flange around at least a portion of the recess in the first scale inner surface.

4. The pocket knife as in claim 1, further comprising a means for releasably connecting the first scale to the second scale.

5. The pocket knife as in claim 4, wherein the means for releasably connecting the first scale to the second scale comprises a threaded spacer between the first and second scales.

6. A pocket knife, comprising:
- a first scale, wherein the first scale has a first scale inner surface;
- a second scale opposed to the first scale, wherein the second scale has a second scale inner surface;
- a blade having a cutting edge, wherein the blade has a retracted position in which the cutting edge is between the first scale inner surface and the second scale inner surface;
- a recess in the first scale inner surface that extends from the first scale inner surface partially through the first scale;
- a diameter of the recess that decreases toward the first scale inner surface;
- a boss that extends from the second scale inner surface into the recess in the first scale inner surface; and
- a perimeter of the boss that increases away from the second scale inner surface.

7. The pocket knife as in claim 6, wherein the boss is threaded into the second scale inner surface.

8. The pocket knife as in claim 6, wherein the recess is elongated, and the perimeter of the boss slidingly engages with the diameter of the recess.

9. The pocket knife as in claim 6, further comprising a means for releasably connecting the first scale to the second scale.

10. The pocket knife as in claim 9, wherein the means for releasably connecting the first scale to the second scale comprises a threaded spacer between the first and second scales.

11. A pocket knife, comprising:
- a first scale, wherein the first scale has a first scale inner surface;
- a second scale opposed to the first scale, wherein the second scale has a second scale inner surface;
- a blade having a cutting edge, wherein the blade has a retracted position in which the cutting edge is between the first and second scales; and
- a means for aligning the first scale to the second scale.

12. The pocket knife as in claim 11, wherein the means for aligning the first scale to the second scale comprises a plurality of recesses in the first scale inner surface, each recess extends from the first scale inner surface partially through the first scale, and each recess has a diameter that decreases toward the first scale inner surface.

13. The pocket knife as in claim 11, wherein the means for aligning the first scale to the second scale comprises a plurality of bosses that extend from the second scale inner surface, and each boss has a perimeter that increases away from the second scale inner surface.

14. The pocket knife as in claim 13, wherein each boss is threaded into the second scale inner surface.

15. The pocket knife as in claim 11, further comprising a means for releasably connecting the first scale to the second scale.

16. The pocket knife as in claim 15, wherein the means for releasably connecting the first scale to the second scale comprises a threaded spacer between the first and second scales.

* * * * *